(No Model.)

O. C. LITTLE.
PULLEY.

No. 483,227. Patented Sept. 27, 1892.

Witnesses.
R. W. Barlow
Henry Fitzgibbon

Inventor.
Orton C. Little
By G. H. Albee
His Atty.

UNITED STATES PATENT OFFICE.

ORTON C. LITTLE, OF MENASHA, WISCONSIN, ASSIGNOR OF ONE-HALF TO DUNCAN T. H. MacKINNON, OF SAME PLACE.

PULLEY.

SPECIFICATION forming part of Letters Patent No. 483,227, dated September 27, 1892.

Application filed September 23, 1891. Serial No. 406,561. (No model.)

*To all whom it may concern:*

Be it known that I, ORTON C. LITTLE, a citizen of the United States, residing at Menasha, in the county of Winnebago and State of Wisconsin, have invented a new and useful Improvement in Pulleys, of which the following is a specification.

My invention relates to a pulley to be formed of cast metal and in sections; and the object of it is to provide a separable pulley with a material for its construction which has sufficient strength to withstand the greatest strain to which it may be subjected, and a pulley which can be placed upon a shaft while it is in its running position and be firmly secured to it. I attain these objects by means of the construction illustrated in the accompanying drawings, in which—

Figure 1:
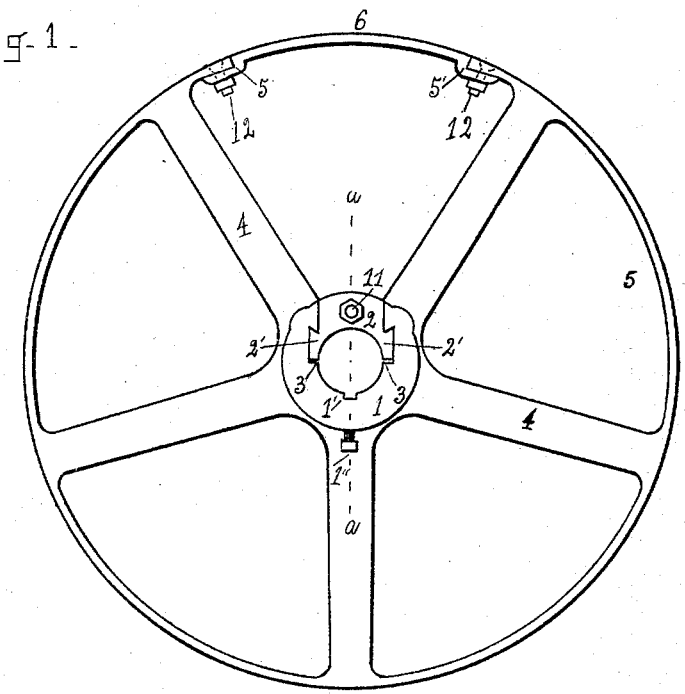
Figure 3:
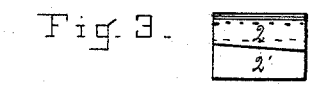
Figure 2:
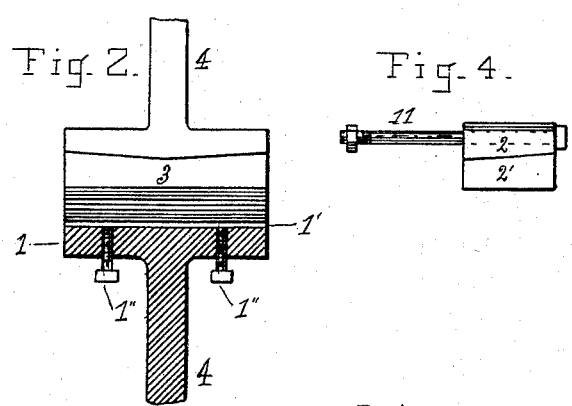
Figure 4:
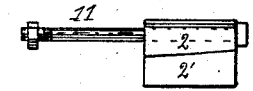

Figure 1 is an elevation of a pulley embodying my invention. Fig. 2 is a vertical section of the larger portion of its hub upon the line *a a* of Fig. 1; Figs. 3 and 4, the remaining sections of its hub.

Similar figures indicate like parts in the several views.

The figure 1 indicates the pulley-hub; 2 2, detachable blocks or parts thereof; 3 3, wedged-shaped recesses or pockets for receiving the wings of the blocks 2; 4, pulley-arms; 5, its rim; 6, a removable segment thereof.

In making the pulley I first cast the parts 1, 4, and 5, which are integral, forming in the hub, by means of cores, the wedge-shaped recesses 3 3 and forming in the rim 5 and segment 6 the seats 5'. The pieces or blocks 2, which are like each other, are cast with wedge-shaped wings 2', one on each side, and are fitted to enter the recesses 3 and 3. A bolt-hole is formed through each of the blocks 2. Said blocks are then inserted into the recesses. A piece of packing of the required thickness may be inserted between each block and the bottom of the recesses, a bolt 11 inserted in the aforesaid bolt-holes, a nut screwed upon the bolt, and thereby securing said blocks within the hub 1. The hub is then bored to the required diameter and the ring segment 6 fitted to its seats and secured with bolts 12 12. The pulley may then be placed upon a mandrel, put in a lathe, and turned, a keyway 1' cut, and a set-screw 1" inserted in the hub, when the pulley after being balanced is ready for use.

Fig. 2 represents the pulley-hub in section, and Figs. 3 and 4 the blocks 2, one for each end of the hub, and a bolt 11 in Fig. 4 for connecting the blocks together.

The recesses 3 in Figs. 1 and 2 have for their lower side a diametrical plane of the pulley for their back or outer sides, a plane at right angles with said diametrical plane, and for their upper sides planes which lie at an acute angle with both of the aforesaid planes, and thereby making at each side of the shaft-slot a wedge-shaped half-dovetail recess. The blocks 2 are fitted with wings corresponding with said recesses, and as they are driven into them the pulley is clamped tightly to the shaft to which it may be applied.

In applying the pulley to a shaft the rim-segment and blocks are removed and the pulley placed upon the shaft with the hub-slot downward. The pulley is thereby supported while the removable parts are being connected. The blocks 2 are then inserted, the bolt 11 screwed up, drawing said blocks toward each other, their wedge form compressing them upon the shaft and securing the pulley thereto.

An additional means for securing the pulley to the shaft is provided in the set-screws 1", and also by driving a key into the keyway 1', the key being a concave one, or one with a seat provided for it in the shaft. The rim-segment is then secured in position, when the pulley is ready for use. The block 2 being provided with half-dovetail projections which fit into corresponding recesses, the act of driving or drawing said blocks toward each other draws the sides of the hub-slot inward and compresses the sides of its bore upon the shaft, instead of expanding its circle, as the wedges without the half-dovetails might do, and thereby strengthens rather than weakens said hub and the entire pulley.

By making the pulley-hub very heavy sufficient strength might be obtained so that the half-dovetail feature in it may be omitted, a square joint being substituted for the half-dovetail one. The latter, however, I consider preferable.

Having described my invention, what I claim, and desire to secure by Letters Patent, is—

A separable pulley having that portion which is adjacent the bore provided with a slot slightly wider than said bore, said slot having upon each side thereof and outward from the axial line of said pulley recesses whose bottom sides are a diametrical plane of said pulley, their back or outer sides planes at right angles with their bottom sides and parallel with the axial line of the pulley, and their upper sides planes lying at an acute angle with both of the aforesaid sides of each recess and forming thereby half-dovetail recesses whose transverse area decreases gradually from their outer ends inward, two blocks for filling said slot, each block having a wing on two of its sides which corresponds with said recesses and being adapted to be driven into said recesses from their outer ends and to clamp the pulley upon a shaft, and a bolt passing through the blocks for retaining said blocks within the slot, substantially as described.

ORTON C. LITTLE.

Witnesses:
J. W. BARLAW,
HENRY FITZGIBBON.